United States Patent [19]

Schächter

[11] Patent Number: 4,938,840
[45] Date of Patent: Jul. 3, 1990

[54] UNIFORM TREATMENT OF LARGE QUANTITIES OF SMALL PARTS

[76] Inventor: Friedrich Schächter, Draschestrasse 31, Vienna, Austria, A-1232

[21] Appl. No.: 340,881

[22] Filed: Apr. 19, 1989

[51] Int. Cl.⁵ .................. B44C 1/22; C23F 1/00; B05D 3/12; B08B 7/00
[52] U.S. Cl. ..................... 156/639; 118/52; 134/33; 134/119; 156/664; 156/345; 204/14.1; 427/240
[58] Field of Search .............. 156/637, 638, 639, 640, 156/656, 664, 345; 134/2, 22.1, 23, 25.1, 25.4, 25.5, 26, 33, 34, 117–121, 166 R; 204/14.1, 25, 212, 213; 118/52–55; 427/240, 241

[56] References Cited

U.S. PATENT DOCUMENTS

| | | | |
|---|---|---|---|
| 3,031,363 | 4/1962 | Soper | 156/637 |
| 3,035,959 | 6/1962 | Wang | 156/637 X |
| 3,793,076 | 2/1974 | Lea | 156/345 X |
| 3,891,456 | 6/1975 | Hohman et al. | 156/664 X |
| 4,563,239 | 1/1986 | Adinolfi et al. | 156/345 X |
| 4,830,638 | 5/1989 | Priestley | 156/345 X |

*Primary Examiner*—William A. Powell
*Attorney, Agent, or Firm*—Pennie & Edmonds

[57] ABSTRACT

The invention relates to an apparatus and method for the uniform treatment of the surfaces of a plurality of individual parts when such parts are processed as a single heap by introducing a mass of parts into a vessel where they form a heap; introducing a treatment medium into the vessel; repeatedly separating and dispersing the parts from the heap and then returning the parts back into the heap in during controlled cycles so that all surfaces of the parts to be treated are exposed to and contacted by the treatment medium. While the parts are separated and dispersed from the heap, the treatment medium is forced around, through and out from the parts so that, after a number of cycles, all surfaces of the parts are uniformly treated by said treatment medium. The parts move back and forth between a first position in a lower portion of the vessel and a second position above and radially outward from the first position, whereby movement of the parts between the first and second positions enables all surfaces of the parts to be uniformly treated by the treatment medium. The parts treated by this method constitute another embodiment of the invention.

33 Claims, 4 Drawing Sheets

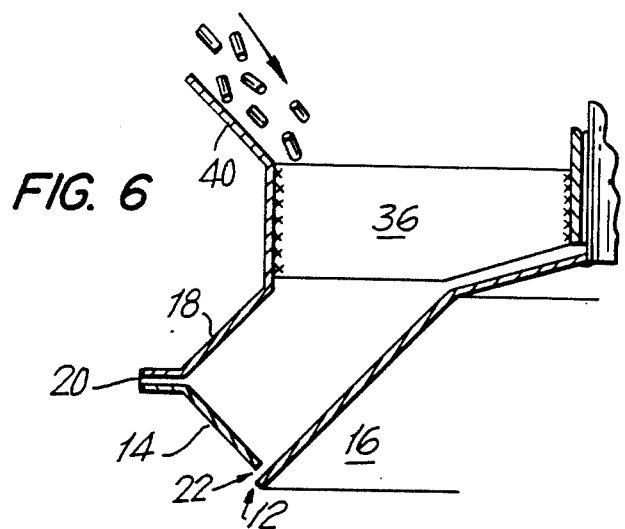
FIG. 6
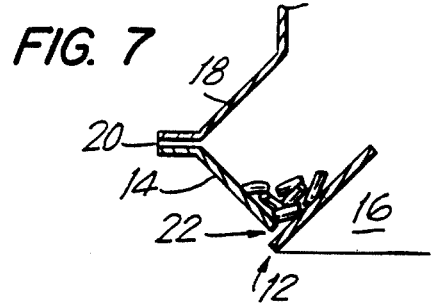
FIG. 7
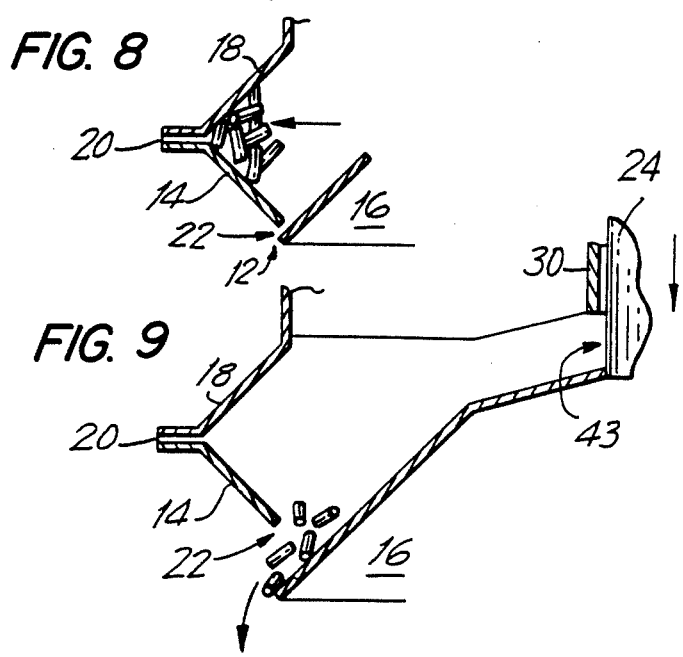
FIG. 8
FIG. 9

UNIFORM TREATMENT OF LARGE QUANTITIES OF SMALL PARTS

TECHNICAL FIELD

The present invention relates to an apparatus and method for mass treatment of small parts in a manner such that a substantially uniform exposure of all accessible surfaces of such parts to a treating medium is achieved. This method utilizes the combination of repeatedly alternating centrifugal and gravitational forces for randomly repositioning and reorienting the parts so that the treating medium is forced into, around, through and out from all surfaces thereof including surfaces which otherwise would be subject to orientational discrimination during exposure to the treating medium, so that all surfaces are uniformly treated by the treatment medium.

BACKGROUND

In the manufacture of products, a wide variety of treating operations are known and used for imparting particular aesthetic or functional features to certain components of such products. For example, electroplating and electroless plating and other techniques can be used to deposit a metal coating upon a substrate. Instead of metal coatings, powdered organic or inorganic materials can be deposited upon such substrates. Etching, pickling, passivating, oxidizing or similar techniques can be utilized for altering the surface of the parts or for preparation prior to a subsequent coating operation. In addition, it is often necessary to clean, dry, rinse, wash, soak or otherwise process such parts to eliminate traces of preceding treatments or remove undesirable foreign matter therefrom.

When the parts to be treated are relatively large in size, any of the previously mentioned operations can be carried out fairly easily. When large numbers of small parts require such treatments, however, various problems can arise, particularly when all accessible surfaces of such parts are to obtain with certainty a high degree of uniformity through such treatments.

The term "treatment" is used to mean that the entire part including all accessible internal and external surfaces is changed, modified or affected. As noted above, typical treatments include electroplating, electroless plating, etching, pickling, passivating, reducing, rinsing, washing, drying, soaking, cleaning, coating, diffusion and the like. As one skilled in the art will appreciate, these treatments all have a common basis in that some type of treatment medium (i.e., a fluid) must come in contact with the surfaces of the part to be treated. Often, the fluid is a liquid, such as an aqueous or organic solution which may be acidic or basic with or without the addition of other chemicals or agents therein. It is also contemplated that the fluid be a gas or mixture of gasses.

In order to obtain uniformly treated parts, the ideal situation would be to process one part at a time. For very large numbers of small precision parts, such as ball point pen tips, for example, it is impractical and virtually impossible to economically employ an individual treatment for each part. Despite their small sizes, such parts are provided with bored openings, narrow gaps and grooves of very high dimensional precision, constituting the ball socket and the ink feed grooves as well as the holes connecting with the ink supply, all of which are necessary for proper operation of the pens in which they are utilized. Due to the large quantity of such small parts, a batch or heap process must be used to treat the surfaces of these parts, whereby a large number of parts, in the form of a large randomly oriented mass which is retained in an enclosure, is introduced into the treating environment.

Due to the contact between the parts and the packing thereof due to their weight, as well as due to the capillary nature of features incorporated in such parts, it is virtually impossible to obtain a uniform treatment of all surfaces of each part. In a situation where such parts are to be electroless nickel plated, for example, it is virtually impossible to assure that all surfaces of each part will experience the same degree of contact and interaction with the plating solution. This results in some portions of the part surface receiving a thinner deposit while other portions receive the appropriate thickness. If the process is continued until all accessible inner and outer surfaces of the parts have, as a minimum, the appropriate thickness, then certain portions of some surfaces will undoubtedly have a greater thickness than calculated. In either situation, the resultant plating is not uniform, with problems occurring because a very high degree of uniformity is required for such parts.

In addition, liquids are retained between the parts due to the varying degree of capillary attraction or adhesion. Such forces of capillary nature are combined with the forces attributable to the angle of contact at the interface of the various treatment mediums and the surfaces of parts to be treated, and further compounded by gas bubbles obstinately resisting displacement by the treatment medium. Such forces restrict the flow of fluid into, through and around the parts, which further contributes to nonuniform and unpredictable results of the treatment of holes, apertures, slots, or other narrow passages relative to other surfaces which are more readily accessible for contact with the treatment medium.

For the electroless nickel plating of such small parts, the volume of the electrolyte containing the nickel compound would be in a varying degree deprived of its active potential as it passes into, between, through or around the parts. This results in a thin deposit on some surfaces while the more accessible surfaces on the outermost parts will interact with electrolyte having a normal potency rate so that a thicker deposit will be achieved there. Surfaces which experience a normal exchange rate would have a predictable deposit thickness proportional to the time the parts are immersed in the electroless nickel bath. If the thickness of deposit on these accessible surfaces is desired to be thin (i.e., on the order of about 2 to 3 micrometers), the coating throughout small openings may be insufficient to allow a coherent, non-porous deposit which is required to achieve corrosion shielding.

Various methods have been attempted in an effort to increase the exchange of liquids through the narrow passages between small parts which are randomly oriented in a heap or other randomly oriented aggregate of such parts. This is of importance when the contact between the objects and a liquid must be of controlled duration in order to obtain a uniform result through the interaction between the surfaces and the liquid, e.g. when etching, plating or rinsing operations are to be carried out and a high degree of uniformity is to be achieved.

According to the prior art, small parts or objects are subjected to prolonged tumbling, vibration or agitation in an attempt to achieve a uniform treatment. These methods, which comprise ultrasonic agitation, vibration, barrel tumbling and the like, possess an inherent disadvantage in that they deleteriously affect or damage sharp edges or fragile thin sections of the parts. In addition, when the surfaces of the parts to be treated are openings such as through-holes, blind-holes or other narrow passages in the parts, the capillary forces (e.g. adhesion, angle of contact, viscosity and surface tension) again would prevent or inhibit the movement and exchange of liquids relative to the totality of the surfaces. These known methods only moderately increase the relative flow but do not overcome flow inhibitions such as those caused by the resistance of small gas bubbles against being displaced or the earlier mentioned capillary attraction forces. The present invention provides a method and apparatus for substantially reducing these problems so that a uniform treatment of all surfaces of such parts can be achieved.

SUMMARY OF THE INVENTION

This invention relates to an apparatus and method for the uniform treatment of the surfaces of a plurality of individual parts when such parts constitute a randomly oriented aggregate which method comprises introducing the parts into a vessel or basket where they form an aggregate; introducing a treatment medium into the vessel; and repeatedly separating, dispersing and expanding the parts from the aggregate and then returning the parts back to the aggregate during controlled cycles so that all surfaces of the parts to be treated are exposed to and contacted by the treatment medium. While the parts are separated and dispersed from the aggregate, the treatment medium is forced into, around, through and out from the parts so that after a number of cycles, all surfaces of the parts are uniformly treated by the treatment medium, since all have had a chance to be in proper orientation relative to the treatment medium.

To achieve the separation, dispersion and expansion of the parts from the aggregate, the vessel is rotated at a speed sufficient to separate and disperse the parts due to centrifugal force. The rotation of the vessel induces the parts to travel from a first position in a lower portion of the vessel in a radially outward and upward direction towards a second position where the parts are retained and restricted from further outward and upward movement while the medium is urged by the prevailing centrifugal force to move radially outwardly through small peripheral openings in the vessel sidewall adjacent the parts where they have been restricted by the vessel from further outward movement by the centrifugal force. Thereafter, the speed of rotation of the vessel can be reduced to allow the parts to return to the first position along the inclined bottom surface of the vessel. If desired, the speed of rotation of the vessel can be repeatedly increased and reduced so as to alternately move the parts between the first and second positions, thus eventually positioning and orienting all surfaces of all parts for contact with the treating medium so as to obtain a uniform treatment of such surfaces.

Generally, the vessel is immersed in the treatment medium, and during rotation the treatment medium enters the vessel through openings in the vessel bottom surface or through other suitable means before it exits the vessel through small openings provided at a maximum diameter in a vessel sidewall adjacent the second position where the parts are retained during rotation of the vessel. It is also possible to remove all of the treatment medium from the parts by removing the vessel from the treatment medium and by repeatedly rotating and stopping the rotation of the vessel, thus allowing the parts to return back to the aggregate shape after the vessel is removed from the treatment medium. Centrifugal force would then urge the treatment medium away from the surfaces of the parts and out of the vessel through the sidewall openings.

In another aspect of the invention, the vessel is introduced into a first treatment medium where the parts are treated as noted above, the vessel is then removed from the first treatment medium and the medium is removed from the parts after the treatment is completed, and then the vessel is introduced into a second treatment medium for a second treatment of the parts. The removal and introduction steps can be repeated as often as necessary into as many different treatment mediums as necessary to effect a plurality of uniform treatments to the surfaces of the parts.

In another embodiment, a carousel having multiple compartments each containing a treatment medium therein can be positioned beneath the vessel, so that when the vessel is removed from one compartment, the carousel can be rotated to position wherein a subsequent compartment and treatment medium is placed beneath the vessel for receiving the vessel and carrying out said further treatment of the parts. Alternatively, the vessel may be moved from one treatment medium to another.

Depending upon the specific design of the vessel, a plurality of treatment medium streams or a single stream can be directed at the bottom surface of the vessel, in combination with a gentle rotation of the vessel, to separate and disperse the parts from the heap already when they are still in the lower first position.

Generally, the treatment medium is a fluid, preferably a liquid, although a gas could be used. Thus, the treatment may include e.g. one or a sequential plurality of electroplating, electroless plating, coating, pickling, passivating, etching, washing, rinsing, soaking, degreasing or drying.

The inventive apparatus used to carry out the process steps forms another aspect of this invention, as does the parts treated thereby.

BRIEF DESCRIPTION OF THE DRAWINGS

Preferred embodiments of the invention are described hereinbelow with reference to the drawing figures wherein:

FIGS. 6–9 illustrate the movement of the parts in the basket of FIGS. 1 or 3 during the treatment process.

DETAILED DESCRIPTION OF THE INVENTION

The invention resolves the problems associated with prior art methods and devices by exposing a heap or other randomly oriented aggregate of small parts and the treatment medium alternately to gravity and to centrifugal forces. This alternation is repeated as often as required and the duration and rotational speeds of these two different phases may be chosen in any required relative proportion in order to reorient and reposition the parts so that all surfaces can be uniformly treated.

Figure 1:
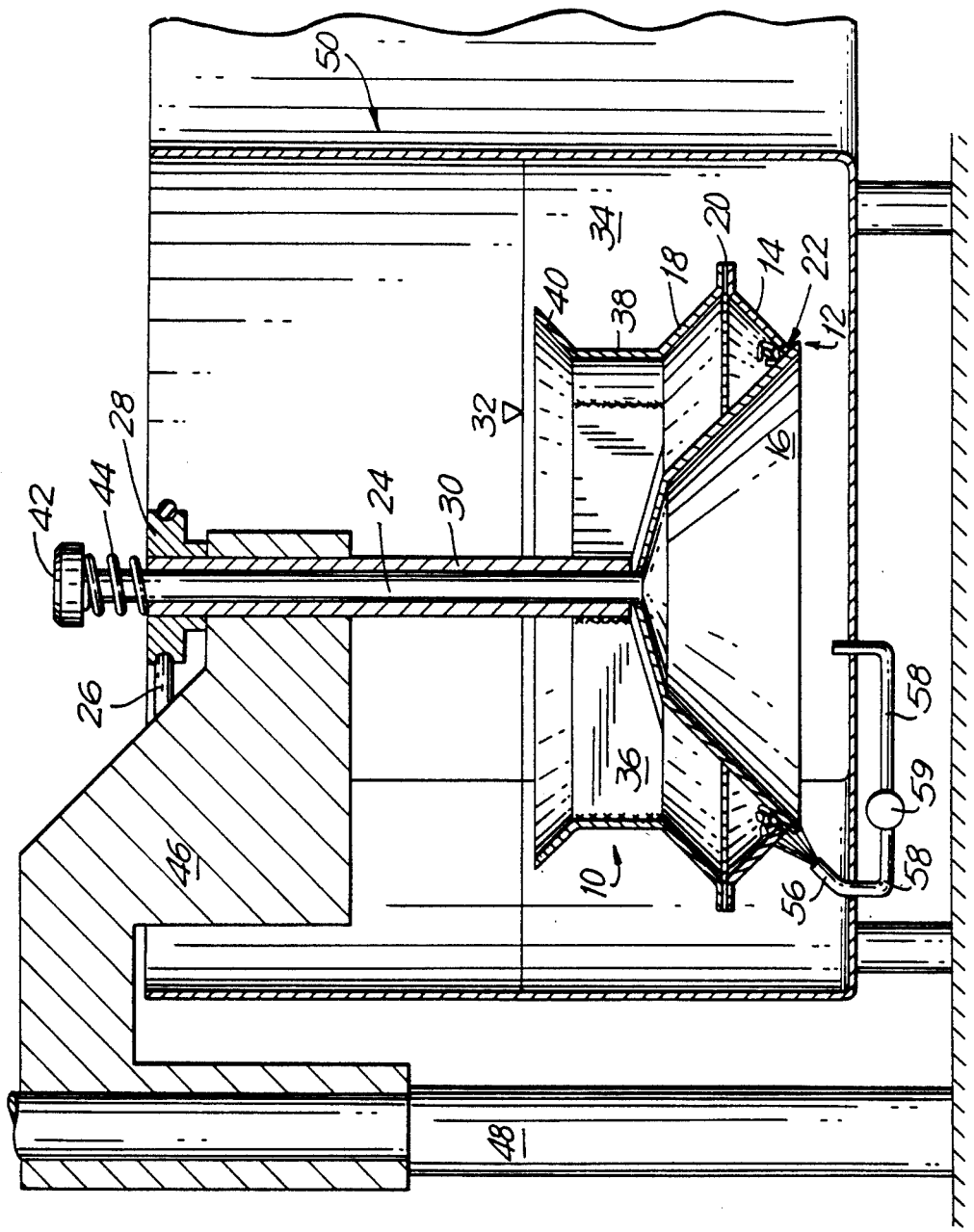
FIG. 1 is a cross-sectional view of a preferred treatment vessel or basket and treatment medium compartment in accordance with the teachings of the present invention.

As illustrated in FIG. 1, the aggregate of parts is contained in a basket 10 having a circular or ring shaped inclined (i.e., V-shaped) bottom surface 12 formed between an outer element 14 and an inner element 16, a sidewall 38 including a circular or ring-shaped plate or baffle 18 for restricting the peripheral and upward movement of the parts when subjected to centrifugal force, a plurality of small outlets 20 on the periphery of the sidewall at a maximum diameter of the vessel and an inlet or a plurality of inlets 22 for allowing new liquid to enter the basket situated on a smaller diameter than the outlets. This basket 10 rotates with vertical rod 24, by the action of cable 26 on pulley 28 attached to cylindrical tube 30. The basket 10 is attached to tube 30 by welding spider plates 36 to an upper portion of the sidewall 38. A suitable number of spider plates, such as three, for example, is used to provide sufficient support for the basket 10. Basket 10 is also provided with an open top bounded by peripheral lip 40.

As shown, the basket 10 is preferably immersed beneath the normal operational level 32 of the liquid treatment medium 34. For the situation when the treatment medium is a fluid, such fluid can enter the basket through the inlets 22 or over the top of the lip 40 of the basket 10 and through openings between the spider plates 38. For the duration of the rotating phase of the basket, liquid which is removed from the basket by centrifugal force through the small outlets 20 is constantly replenished by liquid entering the basket through inlets 22 and by flowing over lip 40.

Basket 10 is operatively associated with means for rotation, illustratively shown by belt 26 and pulley 28. The driving means (not shown) can include any conventional motor having variable speed and directional controls so that clockwise or counterclockwise rotation of the basket at different speeds and accelerations or decelerations can be achieved.

The inner element 16 of the V-shaped bottom surface 12 is securely attached to vertical rod 24, which is provided with head 42. Spring 44 exerts sufficient force between the upper end of tube 30 and head 42 to maintain contact of the outer surface of inner element 16 with the lower edge of bottom surface outer element 14, thus forming small fluid medium inlets 22 capable of retaining the parts in the basket 10 for processing. When the parts are to be removed from the basket, a force is applied to head 42 sufficient to overcome the force of spring 44, thereby separating the inner and outer elements of the V-shaped bottom surface 12 so that parts can pass between the elements. This feature is shown in more detail in FIG. 8, wherein the downward movement of rod 24 is evidenced by increased distance 43 between the attachment point of inner element 15 to rod 24 and the lower end of tube 30.

Means for vertically positioning the basket 10 is also provided, preferably in the form of a lift arm 46 which is raised or lowered by jack 48. This jack 48 which may be electrically, pneumatically or hydraulically operated, can position the basket 10 fully beneath the normal liquid level 32 of the treatment medium 34, partially beneath such liquid level, or when treatment is completed, above the liquid level so that all treatment fluid can be removed from the basket 10. In addition to the removal of liquid due to gravitational forces, the basket 10 can be rotated to utilize centrifugal force to assist in the removal of liquid from between the parts and out of the basket 10.

The treatment medium is retained within tank 50, which has sidewalls sufficiently high to allow basket 10 to be rotated above the liquid level 32 for removal of liquid therefrom without throwing fluid outside of tank 50. Thus, liquid being removed from the outlets 20 of the basket 10 when it is rotated above the liquid level 32 splashes against the inside of the tank 50 sidewalls, where it drops back into the liquid 34 below. In order to be able to rotate the basket 10 in any of these vertical positions, the drive means for the cable 26 and pulley 28 may be mounted on arm 46. Finally, arm 46 is capable of movement to a position above that of the tank 50 sidewalls for transmittal of the basket to a second treatment medium holding vessel. This is accomplished by raising arm 46 to the proper height to remove basket 10 from vessel 50.

Figure 2:
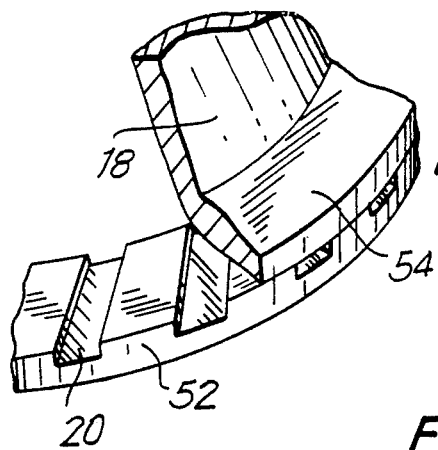
FIG. 2 is an exploded view of a liquid exit flange for the basket of FIG. 1.
Figure 3:
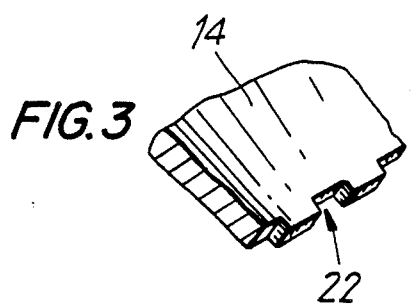
FIG. 3 is an an exploded view of the liquid entry ports located at the bottom of the basket.

FIG. 2 illustrates the liquid outlets 20 which are formed at the largest inner diameter of the basket. These outlets 20 are rectangular shallow grooves cut in flange 52 attached to and forming part of bottom surface 14. Flange 52 mates with flange 54 which extends from sidewall 18. These flanges 52, 54 can be held together in any manner which is known to those skilled in the art. The dimensions of the grooves 20 are controlled in order to obtain the proper rate of liquid exiting basket 10 while retaining the parts therein.

The rotatable basket 10 has a shape which, in conjunction with centrifugal force induced by suitable rotational speeds, moves the parts from a lower resting position, where they form a ring shaped aggregate in the V-shaped bottom 12 of vessel 10, to a higher position where they form a ring-shaped mass having a diameter as large as the largest internal dimension of the basket permits. The outlets 20 are placed at this largest dimension, which is bound by the bottom surface outer element 14 and sidewall 18. The coefficient of friction determines, in part, the degree of centrifugal force necessary to move and expand all parts to the higher position. After the parts or objects to be treated reach this position, the speed of the basket could be reduced just enough to maintain the ring-shaped mass at such maximum periphery. The speed is preferably controlled sufficiently to allow the treatment medium to flow into, around, through and out of the parts. Also, speed control can be used to allow the parts to circulate to expose and orient all surfaces relative to the treatment medium.

When the speed is reduced, the parts slide back into the aggregate shape, thereby further changing their individual positions so that when they again are subjected to the centrifugal force, their surfaces or other features will have taken a different position and orientation. If the basket has its rotation determined by a controlled speed system, any required degree of gentleness or vigorousness of movement can be achieved, and rotation could be counterclockwise, clockwise or oscillating, as desired. A change of direction of rotation (e.g. from clockwise to counterclockwise) also assists in the repositioning and reorienting of the part surfaces.

The best mode of the invention relates to the electroless plating of a plurality of ball pen points with a deposit of nickel. As such, the treatment medium is an electroless nickel plating bath preceded and succeeded by preparatory and subsequent treatment baths. No particular criticality is attributed to the specific composition of this bath: any conventional electroless nickel electrolyte would be suitable for use in the process of this invention.

Figure 4:
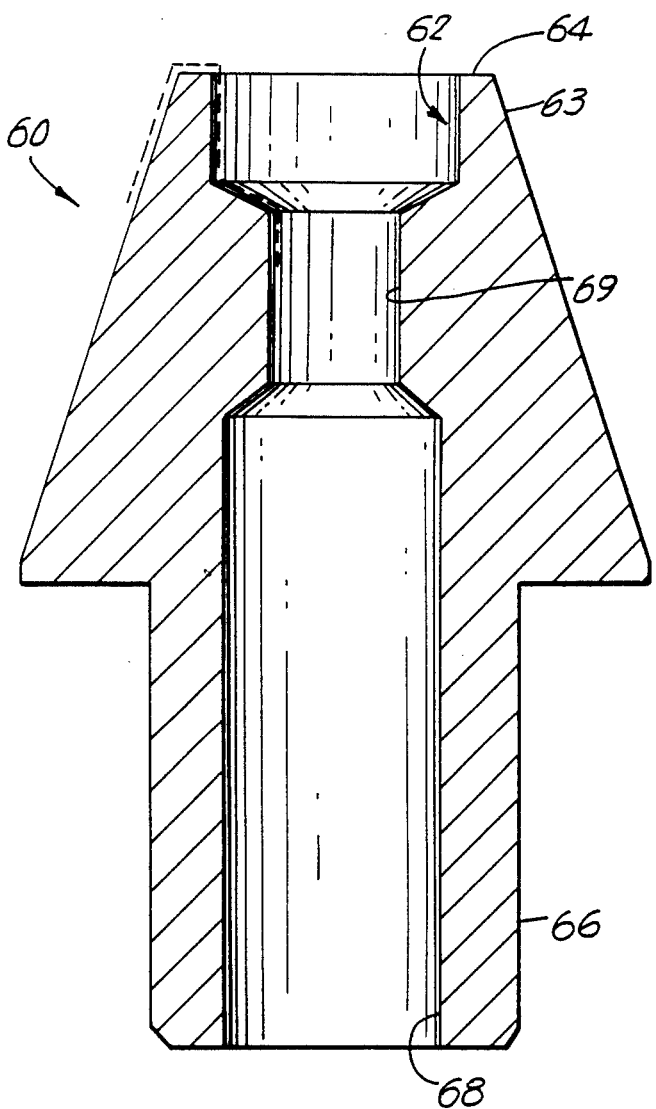
FIG. 4 is a cross-sectional view of a ball pen point which is nickel plated in accordance with the process of the invention.

When a plurality of ball pen writing points, such as the one illustrated as 60 in FIG. 4, are plated with electroless nickel in accordance with this invention, it is possible to obtain a uniform deposit of 2 to 3 micrometers in the critical areas such as the ball socket 62 and the ball retaining lip 62 and rim 64, as outlined by the dotted line, while all other surfaces, such as the shank 66, connecting hole 68 and capillary hole 69, which surfaces are to be protected from contact with the ink, will be provided with a coating having a thickness in the range of 1 to 1.5 micrometers. The general construction of such pen points is well known in the art, but it was heretofore not possible to achieve such uniform dimensions of the coatings thereupon, which coatings are intended to increase the corrosion and/or wear resistance of the points. Since the writing quality of the pen depends upon the precision and geometry of the machining of the points, the deposit of a non-unifrom coating upon such points would defeat the objective of such precision machining, which can be accomplished at a tolerance level of ±1.5 micrometers.

Verification of the exact thickness of the electroless plating can be obtained by X-ray fluorescence measurement with methods such as 3-D topological surface mapping. A 0.1 mm spot size would be suitable for such measurements on writing points. An acceptable instrument for carrying out these measurements is available from Veeco Instruments, Inc., Syosset, New York, as Model XRF300.

Referring again to FIG. 1, the treatment medium 34 could be an electroless nickel plating solution, which can enter the basket 10 through openings 22 in bottom surface 14. These openings 22 are formed by grooves cut in the bottom of plate 14 at the point where plate 14 meets plate 16. The basket 10 and all materials that come in contact with electroless nickel bath are formed from polypropylene or other suitably resistant material. If desired, aromatic polyester liquid crystal polymers, such as Dupont HX-2000, 3000 or 4000 series Thermoplastic Polyester Resins can be used for the basket when higher temperature treatment mediums are contemplated.

If desired, although not necessary for this embodiment, a sparge pipe 56 can be used to direct a stream of properly mixed and agitated plating solution toward inlets 22. This solution is recirculated from the treatment medium holding vessel 50 through pipe 58, by way of pump 59 positioned in pipe 58 which leads to sparger 56. Alternatively, a plurality of spargers arranged in a row or circular configuration or a single ring-shaped sparger can be used for directing the plating solution at the basket 10 when the basket is not rotated. Also, for the embodiment shown, basket 10 is rotated in either a clockwise or counterclockwise direction, or can be oscillated, to assist in contacting the entire aggregate of parts with the solution.

It would be advantageous to utilize a continuous process for sequentially subjecting the parts to different treatments. For example, in the electroless nickel plating of parts, it may be desirable to initially degrease the parts by immersion in a solvent, followed by a rinse whereby all solvent is removed, prior to immersing the parts in the electrolyte. Thereafter, a rinse is used to remove remaining electrolyte from the plated parts, followed by a drying operation as a final treatment to the rinsed parts.

It is possible to utilize a single vessel 50 into which the various solutions can be introduced and removed. These solutions are held in various storage tanks which are connected to vessel 50 by the appropriate piping, valving and pumping arrangements. The vessel 50 is initially filled with a first treatment medium and the basket 10 is lowered into the medium for treatment of the parts. After competion of the first treatment, it is possible to remove substantially all of the liquid entrained between, around or inside the parts by rotating the basket while the basket is raised above the normal liquid level 32 of the treatment medium, but within the walls of the vessel 50, so that the resulting centrifugal force drives the treatment medium out from the basket and its contents and back into the liquid 34. Then, the treatment medium is removed from the vessel 50, by draining or pumping, while the basket remains in the raised position. A subsequent medium is then introduced into the vessel, again preferably by pumping, and the sequence is repeated. This can be done as often as necessary for the desired number of treatments.

Figure 5:
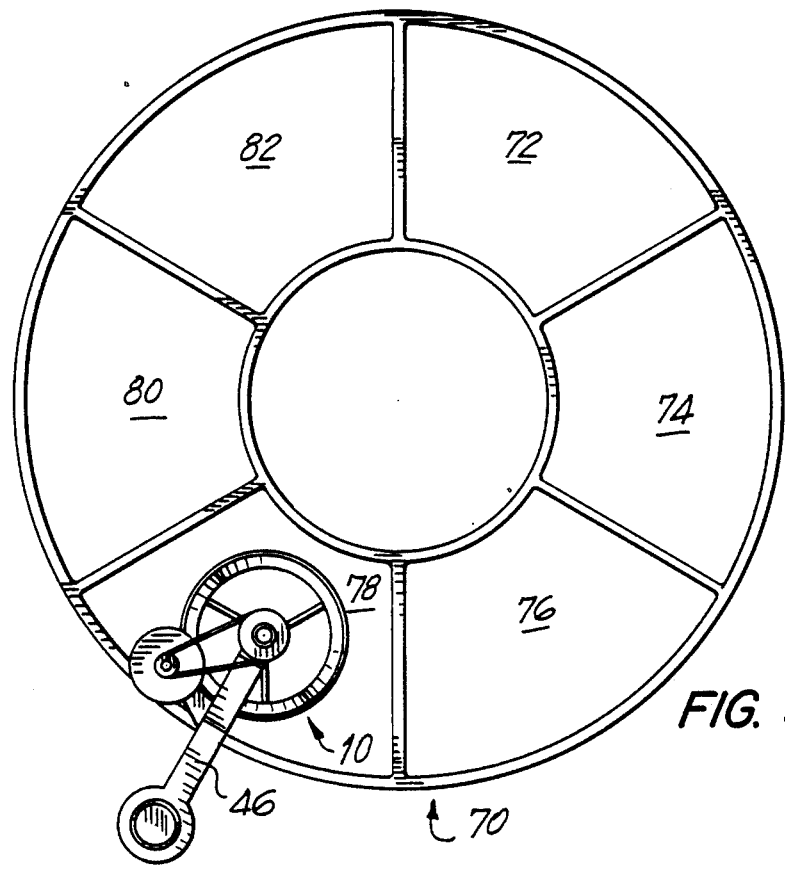
FIG. 5 is a top view of an apparatus for sequentially carrying out a plurality of treatment methods with the basket of FIG. 1.

For larger production volumes, such multiple, sequential treatments can also be carried out by providing the mechanism 48 for raising and lowering the basket in combination with a rotatable carousel 70, as shown in FIG. 5. This enables multiple baskets to be used simultaneously in combination with the separate treatment mediums. The carousel 70 generally has a plurality of compartments 72, 74, 76, 78, 80, 82, each with a different treatment medium therein. The lifting of one or more baskets, followed by the indexing of the carousel in the desired position, allows a different compartment to be placed under the basket or baskets for subsequent treatment.

While the basket or baskets are raised, the treatment medium can be removed as noted above. The walls of the compartments are sufficiently high to prevent mixing of the treatment mediums when the basket is rotated to remove same. The basket or baskets are then introduced into the subsequent compartments for treatment by repeating the earlier described cycle of alternately exposing the parts to the forces of gravity and to centrifugal forces as in the previous compartment.

As illustrated in FIG. 5, carousel 70 can retain, e.g., six different treatment mediums in its compartments. A typical process would include a degreasing solvent in compartment 72, a solvent rinse in 74, a water rinse in 76, an electroless nickel plating solution in 78, another water rinse in 80 and heated air recirculation chamber in 82 to dry the plated parts. FIG. 5 shows the parts in basket 10 in the electroless nickel plating solution of compartment 78, with the water rinse 80 and drying treatment 82 remaining before the cycle will be completed.

As noted above, the basket can be rotated after being lifted above the liquid level to remove remaining liquid from the parts. The compartment walls should extend sufficiently above the normal liquid level of the treatment fluid to prevent liquid which is driven out where the basket is rotated to contaminate adjacent compartments.

Other arrangements can be used to achieve sequential treatments of the parts. Although not preferred, it is possible to arrange for the basket to be moved along a path of travel between adjacent vessels which contain different treating solutions. This embodiment can also utilize multiple baskets for increased production rates.

FIGS. 6-9 illustrate the loading, unloading, and movement of the heap of small parts during the treatment cycle referred to above. Initially, as shown in FIG. 6, the parts are introduced into the basket preferably before the basket is immersed into the treatment medium. The rotation of the basket is oscillated to distribute these parts evenly so that they occupy the V-shaped bottom of the basket as shown in FIG. 7. When the basket is thereafter rotated to the appropriate speed, the ring-shaped aggregate of parts is raised and expanded to the area bounded by the outer portion of the bottom 14 and sidewall 18 of basket 10. As the basket continues to rotate, the treatment medium passes into, around, through, and out from the parts and then exits the vessel through openings 20, as illustrated in FIG. 8.

During operation of the basket as shown in FIGS. 7 and 8, a stream of treating medium may be directed toward the inlets 22. After the parts have received their treatments and the rotation of the basket is terminated, the parts return to their initial ring-shaped configuration in the lowest portion of V-shaped bottom. At that time, the parts can be removed from the basket by separating the V-shaped bottom surface at the point of the V.

In FIG. 1, the upper portion 18 of the basket 10 is attached to tube 30 by means of spider plates 36. The openings between these plates allow the introduction of the parts into the vessel. The bottom wall 16 is connected to a rod 24 which is movable axially relative to tube 30. Thus, the unloading of the parts shown in FIG. 8 is carried out by separating plate 16 from plate 14. The separation of inner and outer elements is described above.

As is evident from the other portions of the present specification, the phase of treatment shown in FIG. 6 is carried out before the basket is introduced into the treatment medium. The phase of treatment shown in FIG. 9 is carried out after lifting the basket above the medium 34 of the last treatment compartment, carefully spinning off the treatment medium and placing a catch pan underneath the basket but before the parts are removed therefrom.

To move the parts to the upper position shown in FIG. 8, a rotational speed sufficient to overcome that of gravity and the coefficient of friction is required. As soon as the parts attain the ring-shaped mass configuration, the rotational speed can be reduced. A preferred diameter for the basket is about 500 mm at the maximum inner diameter and 450 mm at the lower position of the parts. Also, grooves 20 preferably have a depth of 0.5 mm and a width of 3 mm, their length being the same as the width of flange 52. If desired, the grooves 20 can be of any angular orientation with respect to the flange to achieve the desired flow rate of the treatment medium exiting the vessel.

This forced flow method can be useful for cleaning, electroplating, depositing, sublimating, insulating, hardening, wetting, making repellant, etching, making conductive, reactive, making inert, or to produce any reaction that can be achieved through the interaction of liquids, solids or gases upon the surfaces of small parts which are treated in a batch, heap or aggregate.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for the uniform treatment of the surfaces of a plurality of individual parts when such parts constitute a randomly oriented aggregate, which method comprises:

introducing a plurality of parts into a vessel to form such aggregate;

introducing a treatment medium into said vessel; and repeatedly separating and dispersing said parts from said aggregate and then returning the parts back into said aggregate during controlled cycles;

wherein all surfaces of said parts to be treated are exposed to and contacted by said treatment medium and, while said parts are separated and dispersed from said aggregate, the treatment medium is forced into, around, through and out from said parts so that after a number of cycles, all surfaces of said parts are uniformly treated by said treatment medium.

2. The method of claim 1 wherein said vessel is rotated at a speed sufficient to separate and disperse said parts from said aggregate due to centrifugal force.

3. The method of claim 2 wherein the rotating of said vessel induces said parts to travel from a first position in a lower portion of said vessel in a radially outward and upward direction towards a second position where said parts are retained and restricted from further outward and upward movement.

4. The method of claim 3 wherein the vessel includes an inclined bottom surface and the speed of rotation of the vessel is reduced to allow the parts to return to the first position along said inclined bottom surface.

5. The method of claim 4 wherein said speed of rotation of the vessel is repeatedly increased and reduced so as to alternately move said parts between said first and second positions, thus eventually positioning, orienting and exposing all surfaces of the parts for contact with said treating medium so as to obtain a uniform treatment of said surfaces.

6. The method of claim 3 wherein said vessel is immersed in said treatment medium.

7. The method of claim 6 wherein said treatment medium enters said vessel through openings in a bottom surface of said vessel and exits through perforations in a vessel sidewall adjacent the second position where said parts are retained during rotation of the vessel.

8. A method for the uniform treatment of the surfaces of a plurality of individual parts when such parts constitute a randomly oriented aggregate, which method comprises:

introducing a plurality of parts into a vessel to form an aggregate;

introducing said vessel into a treatment medium so that said treatment medium enters into said vessel;

repeatedly separating and dispersing said parts from said aggregate and then returning the parts back into said aggregate during controlled cycles, wherein all surfaces of said parts to be treated are exposed to and contacted by said treatment medium and, while said parts are separated and dispersed, and expanded from said aggregate, the treatment medium is forced around, through and out from said parts so that after a number of cycles, all surfaces of said parts are uniformly treated by said treatment medium; and removing said vessel from said treatment medium after said treatment is completed.

9. The method of claim 8 wherein said treatment medium is removed from said parts by removing said vessel from said treatment medium and repeatedly rotating and stopping the rotation of said vessel, thereby removing substantially all treatment medium from said parts and vessel.

10. The method of claim 8 which further comprises introducing said vessel into a second treatment medium for a second treatment of said parts.

11. The method of claim 10 which further comprises repeating said removal and introduction steps as often as necessary into as many different treatment mediums as necessary to effect a plurality of uniform treatments to the surfaces of said parts.

12. The method of claim 11 which further comprises positioning a carousel having multiple compartments each containing a treatment medium therein beneath said vessel so that when said vessel is removed from one compartment, said carousel can be rotated to position wherein a subsequent compartment and treatment medium is placed beneath said vessel for receiving said vessel and carrying out said further treatment of said parts.

13. The method of claim 12 wherein multiple baskets are utilized, one for each compartment of said carousel, so that increased production rates can be achieved.

14. The method of claim 11 wherein said vessel is moved from one treatment medium to another, and wherein a stream of treatment medium is directed at the bottom surface of said vessel while gently rotating said vessel to assist in the separation and dispersion of the parts from said heap.

15. The method of claim 8 wherein said treatment medium is a fluid.

16. The method of claim 15 wherein the fluid is a liquid.

17. The method of claim 8 wherein said treatment comprises one or a sequential plurality of electroplating, electroless plating, coating, pickling, passivating, etching, washing, rinsing, soaking, degreasing or drying.

18. A method for the uniform treatment of the surfaces of a plurality of individual parts when such parts constitute a randomly oriented aggregate, which method comprises:

introducing an aggregate of parts into a vessel;
introducing into said vessel a treatment medium; and
separating and dispersing said parts from said aggregate in a controlled manner so that all surfaces of said parts to be treated are exposed to and contacted by said treatment medium so that all surfaces of said parts are uniformly treated by said treatment medium;
said parts moving back and forth between a first position in a lower portion of said vessel and a second position above and radially outward from said first position, whereby movement of the parts between said first and second positions enables all surfaces of the parts to be reoriented and repositioned so that they can be uniformly treated by the treatment medium.

19. The method of claim 18 wherein said vessel is rotated while immersed in said treatment medium at a speed sufficient to separate and disperse said parts from said heap due to centrifugal force.

20. The method of claim 19 which further comprises removing said vessel from the treatment medium and introducing said vessel into another treatment medium for a second treatment of said parts.

21. The method of claim 20 which further comprises repeating said removal and introduction steps as often as necessary into as many different treatment mediums as necessary to effect a plurality of uniform treatments to the surfaces of said parts.

22. The method of claim 21 which further comprises positioning a carousel having multiple compartments each containing a treatment medium therein beneath said vessel so that when said vessel is removed from one compartment, said carousel can be rotated to position wherein a subsequent compartment and treatment medium is placed beneath said vessel for receiving said vessel and carrying out said second treatment of said parts.

23. An apparatus for use in the uniform treatment of the surfaces of a plurality of individual parts when such parts constitute a randomly oriented aggregate, comprising:

means for holding an aggregate of parts to be treated and including an inclined bottom surface and a sidewall, a portion of which has a diameter which is the largest width of the holding means;
means for introducing said parts into said holding means;
means for introducing a treatment medium into said holding means for treatment of the surfaces of said parts; and
means to facilitate exit of said treatment medium located in said sidewall portion;
wherein said treatment medium and said apparatus separates and disperses said parts from said aggregate in a controlled manner so that all surfaces of said parts are exposed to and contacted by said treatment medium so that said surfaces are uniformly treated thereby.

24. The apparatus of claim 23 wherein the treatment medium introducing means is located in the bottom portion of said holding means.

25. The apparatus of claim 23 further comprising means for moving said parts from a first position in a lower portion of the holding means to a second position adjacent said sidewall portion to assist in the uniform treatment of said surfaces.

26. The apparatus of claim 25 wherein said parts moving means comprises means for rotating said holding means.

27. The apparatus of claim 23 which further comprises means for raising and lowering said holding means.

28. The apparatus of claim 23 which further comprises a treatment medium container so that said holding means may be introduced into said container for treatment of said surfaces and removed therefrom after such treatment.

29. The apparatus of claim 28 wherein said container includes at least one nozzle positioned and oriented to direct at least one stream of treatment medium towards said inclined bottom surface of said holding means when said holding means is immersed in said treatment medium in said container.

30. The apparatus of claim 28 wherein said container includes means for pumping said treatment medium into or out of said container.

31. The apparatus of claim 28 wherein said container includes multiple compartments each holding a treatment medium therein so that said holding means may be introduced into different compartments for subsequent treatment of said surfaces.

32. The apparatus of claim 31 wherein said container includes indexing means so that, when said holding means is removed from said container, a different compartment of said container can be positioned beneath said holding means.

33. The apparatus of claim 23 which further comprises means for facilitating removal of said parts from said holding means after treatment thereof.

* * * * *